No. 738,460. PATENTED SEPT. 8, 1903.
F. LEVECK.
APPARATUS FOR RIDDING POULTRY OF VERMIN.
APPLICATION FILED FEB. 21, 1900.

NO MODEL.

WITNESSES:
Charles H. Spiegel
N. Smith

INVENTOR.
Frank Leveck
BY
Wm. Hubbell Fisher
ATTORNEY.

No. 738,460. Patented September 8, 1903.

UNITED STATES PATENT OFFICE.

FRANK LEVECK, OF SYMMES TOWNSHIP, OHIO.

APPARATUS FOR RIDDING POULTRY OF VERMIN.

SPECIFICATION forming part of Letters Patent No. 738,460, dated September 8, 1903.

Application filed February 21, 1900. Serial No. 6,020. (No model.)

*To all whom it may concern:*

Be it known that I, FRANK LEVECK, a citizen of the United States, and a resident of the township of Symmes, in the county of Hamilton and State of Ohio, have invented certain new and useful Apparatus for Ridding Poultry of Vermin, of which the following is a specification.

The several features of my invention and the various advantages resulting from their use, conjointly or otherwise, will be apparent from the following description and claims.

Figure 1:
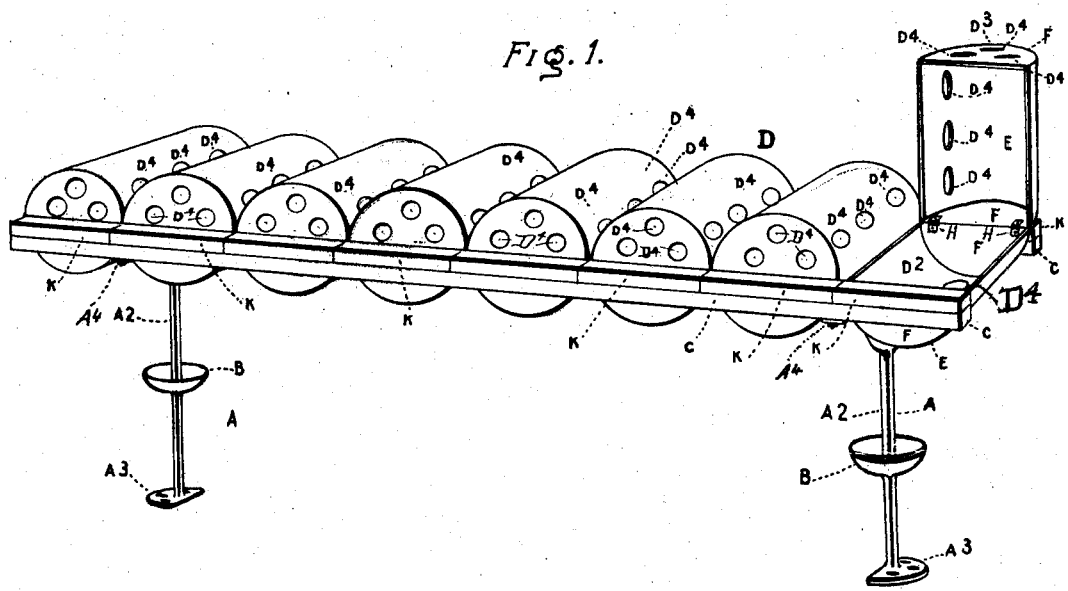
Figure 2:
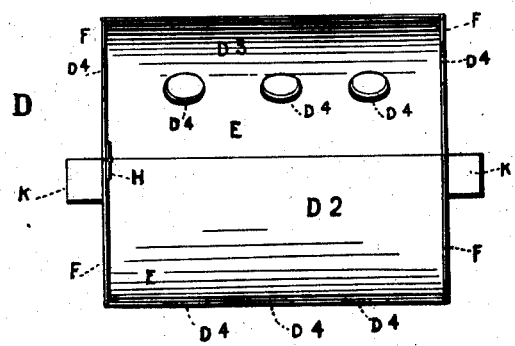

In the accompanying drawings, making a part of this application, and in which similar letters of reference indicate corresponding parts, Figure 1 is a view in perspective of a nesting apparatus, illustrating my invention. Fig. 2 represents a vertical central section of one of the nesting-boxes for use in such apparatus.

I will now proceed to describe my invention in detail.

A A respectively indicate the supports. Each support A is provided with a bowl or vessel B, which should be so open at the top as that the fumes or odor or the vapor from the vermifuge or vermicide contained therein shall be capable of rising unrestrained therefrom. Such vessel is an important accompaniment of the support, no matter of what form the support may be. The preferred form of support is that shown, and consists of an upright $A^2$, having a suitable foot $A^3$. The foot $A^3$ is adapted to be secured to the foundation upon which it is to rest. The vessel B is in the shape of a bowl and is cast with and to the upright $A^2$, the latter being at the center of the bowl, as shown. The advantage of having the vermifuge (liquid or solid) in the bowl surround the upright will be at once apparent, for the reason that vermin on the ground cannot reach the structure above the bowl without crossing the vermifuge. This they will not cross. Hence the structure or structures above the bowl are immune from the advance of vermin by way of the uprights. The principal kinds of vermin which attack poultry have no wings and must, therefore, reach their desired destination by crawling. The uprights or standards A support horizontal bars. These bars C are parallel, and upon them may be located the boxes I have prepared for nesting and setting. One of the main features of these boxes is the making the bottom of each sufficiently open to allow the fumes, odors, or vapors from the vermifuge or vermicide to pass into such box and reach its contents. To this end I provide openings $D^4$ in the bottom. When I provide the box with a cover, I provide openings in the cover or in the upper portions of the sides, so as to admit air for the occupant to breathe and also to admit to a degree the vapors, fumes, or odors from the vermicide or vermifuge.

In carrying into effect these features of my invention relating to boxes I have devised a novel and extremely simple, light, and strong box, easily manipulated, readily cleaned, and economical of manufacture. Such box is as follows: D indicates the box, of which $D^2$ is the bottom portion, and $D^3$ is the top portion. The box is of sheet metal and when closed is substantially of the shape of a cylinder. The bottom is of the shape of a half-cylinder, and the top is substantially of the same shape. The ends F are soldered or otherwise secured to the semicylindrical portion E, for which they are designed.

In carrying into effect the features heretofore mentioned I provide the bottom with openings $D^4$. These are preferably three in number and located in the bottom of the bottom portion or lower half $D^2$ of the cylinder. I provide the top with similar openings $D^4$. These are preferably six in number, three on each side, as shown, the top of the semicylinder $D^3$ being left imperforate, so as to prevent rain or other matter falling from above from striking the hen occupying this box. I also provide in each end F of the top portion $D^3$ openings $D^4$, preferably three in number and arranged triangularly, substantially as shown.

To prevent the top $D^3$ from altogether leaving the bottom $D^2$ and also to enable it to accurately fit upon the bottom when closed, I connect the adjacent ends of the parts $D^2$ $D^3$ at one end of the box or cylinder by a hinge H. Thus the top part $D^3$ may be lifted away from the bottom part $D^2$, as shown in Fig. 1, affording full and easy access to the interior of the cylinder. The cylinder $D^2$ $D^3$ is readily and conveniently supported as follows: To the outside of the upper portion of each end F of the lower half-cylinder $D^2$, I connect a short bar K. The latter enables me to duly support the cylinder, one of these bars resting upon one of the bars C and the other bar K resting upon the other of the bars C, substantially as shown. This arrangement enables the box or cylinder D to be quickly taken from the bars C C and to be as quickly replaced. Also the cylinder may be readily pushed along on the bars C C as desired.

The mode in which my invention operates is as follows: The vessels B are duly filled with a vermifuge or a vermicide. The preferred article for this purpose is carbolic acid, and this will usually be diluted in water. When a hen is to be set, clean straw or the like is placed in the semicylinder $D^2$, and the eggs to be hatched are placed thereon. The hen is then placed on the eggs or allowed to go on them, and the top $D^3$ is lowered, shutting her in. The top is kept closed except when the bird is to be let out for a few minutes to drink and eat, if she desires. Upon her return the top is again closed. By the closed top the bird is thus protected from the attacks of other birds or animals. The openings $D^4$ in the top and end of the cylinder allow of ample circulation of air for the bird to breathe easily. The openings $D^4$ in the lower half of the cylinder admit the fumes of the vermicide, which latter penetrate into the cylinder and permeates the straw and the feathers of the bird, and reaches the skin of the latter. The vermin will immediately leave the bird, the nest, and the cylinder and drop to the ground or attempt to escape by way of the bars, with the result heretofore mentioned. Thus in a short time the bird, her nest, and the cylinder and the entire apparatus will be freed from vermin.

Among the advantages resulting from these features of my invention is the following one, not obvious to the general public. When a setting hen is infested with vermin, they cause her much discomfort, and when she leaves her nest for drink or food she often takes time to endeavor to get rid of them, scratching herself and picking at the vermin. This operation often detains her so long that when she returns the eggs are chilled and will no longer hatch, the growing life therein having been killed.

My invention rids the hen of vermin while setting, and therefore when she leaves the nest for drinks he has no occasion for stopping to rid herself of insects.

After the eggs are hatched and the eggs and chicks have left the nest the cylinder can be immediately removed, the dirty contents taken, and fresh clean nesting material be inserted and the cylinder be replaced in readiness for use.

What I claim as new and of my invention, and desire to secure by Letters Patent, is—

1. An antivermin hen's nest comprising a semicylindrical sheet-metal body, having openings therein, and a semicylindrical cover hinged thereto at one end and also having openings substantially as described.

2. In combination, the pair of vertical standards, receptacles encircling said standards for carrying an antivermin substance, parallel bars supported by said standards, and a plurality of cylindrical nests held between said bars and having their ends removably supported thereby, said nests comprising each a pair of semicylindrical sections hinged together and suitably perforated, substantially as described.

FRANK LEVECK.

Attest:
 SAMUEL A. WEST,
 K. SMITH.